United States Patent Office 3,175,910
Patented Mar. 30, 1965

3,175,910
MANUFACTURE OF MALT BEVERAGE
Toshitada Fukaya, Mikio Kato, and Tadanori Ito, all of Ibaragi-ken, Japan, assignors to Kyowa Hakko Kogyo Co., Ltd., Tokyo, Japan, a corporation of Japan
No Drawing. Filed Feb. 7, 1963, Ser. No. 256,829
Claims priority, application Japan, Feb. 12, 1962, 37/4,496
1 Claim. (Cl. 99—51)

The present invention relates to a method for the manufacture of alcoholic malt beverage. More particularly, the invention relates to a method for the manufacture of a beverage which is similar to beer with respect to flavor, taste and appearance, by a purely fermentation procedure, utilizing malt, rice or rice bran, minor cereals, starch, starch syrup, hops and amino acid as the materials in the mashing process, and utilizing pure protein and a protease, as nitrogen source, in such mashing process.

Beer has long been produced from malt, as the essential starting material. Malt is comparatively expensive, and it is therefore a desideratum in the art to produce a beverage which is as close as possible to beer, but which involves the use of less expensive substitutes for malt. Heretofore-produced beverages of this type have been subject to defects such as poor "body" and poor "foam retention," deficiencies to which the beverage consumers are sensitive.

The present invention solves the problem of preparing malt beverage which is closely similar to beer but is made with a much reduced quantity of malt, compared to that heretofore employed in making the true malt beer, and which is free of defects as regards "body," "foam retention" and other consumer required properties.

A "blending" process has heretofore been described for the manufacture of beer-like, foaming drinks, involving purified protein, protein-hydrolysate, sugar material, etc. such process is characterized by "blending" steps: preparation of fermented liquor, addition of ethyl alcohol, charge of carbon dioxide under pressure.

In sharp contrast to this "blending" process, the process of the present invention involves exclusively fermentation procedure.

According to this invention, rice or rice bran, and minor cereal (millet, Italian millet, barnyard millet or a mixture thereof) are milled, and mixed with starch, starch syrup and pure protein. This mixture is boiled to form a paste, to which there is then added the minimum amount of malt required for saccharification. The mixture is then retained at a suitable temperature for a period of time, after which protease is added, and the mixture again allowed to remain for a further period of time at a suitable temperature for hydrolysis of protein. Upon filtration of the mixture, the necessary wort is obtained as filtrate. A small quantity of hops and of amino acid(s) is then added to the solution which is then boiled to enhance the flavoring of the solution. The boiled solution is then cooled, inoculated with cultured yeast and fermented up to a suitable degree. Fermentation is then continued at a lower temperature, this phase being carried out in a closed vessel for maturing. Upon completion of the maturing and the full dissolution of carbon dioxide, the fermented liquor is filtered to yield the new beverage.

Following is a quantitative statement of ranges of materials used according to the present invention for the production of one kiloliter of beverage:

| | | |
|---|---|---|
| Starch syrup | kilograms | 30 to 100 |
| Minor cereal (single or admixture) | do | 5 to 60 |
| Starch | do | 10 to 30 |
| Malt | do | 10 to 35 |
| Rice or rice bran | kilograms | 5 to 10 |
| Amino acid(s) | do | 0.1 to 1 |
| Plant protein | do | 3 to 12 |
| Proteolytic enzyme | grams | 10 to 40 |
| Hops | kilograms | 1 to 5 |

As is evident from the foregoing tabulation, the materials used in making the new beverage are not constituted solely by starchy materials. Use of the rice or rice bran increases the stabilities of the saccharified solution because of the buffer action of the phosphoric compounds contained therein. Use of the purified protein and protease also makes possible the dissolution of a suitable amount of nitrogenous compounds, which enhance the smoothness of the fermentation by means of the yeast and favor the production of a well-foaming beverage of good flavor and taste, these results being also favored by the amino acid present.

The purified protein and protease are especially indispensible to the process of the invention. Previously manufactured foaming beverages of the type here involved have been regarded as inferior in "foaming" and in "foam-retention." The present process makes it possible to increase the nitrogen content of the beverage up to the same level as that of beer, and concomitantly to improve the "foam-retention" property to a satisfactory level, by the expedient of decomposing the purified protein under suitable conditions with a suitable quantity of the protease used.

A variety of pure proteins and proteases can be used for the purposes of the present invention. When a wort is prepared, employing pure gluten (e.g., "Hyprogluten"— Shinshin Shokuryo Co., Japan) as purified protein, and "Pronase-AS" (supplied by Kaken Kagaku Co., Japan) as protease, the nitrogen content may vary within the ranges indicated in the following:

| | Milligrams/milliliters |
|---|---|
| Protein–N | 5 to 10 |
| Peptide–N | 40 to 60 |
| Amino–N | 40 to 80 |

*Example*

A presently preferred illustrative embodiment of the invention is set forth in the following example, wherein parts by weight bear the same relationship to parts by volume as do grams to milliliters:

10 grams of rice, 10 parts by weight of millet and 10 parts by weight of pure gluten are milled together, mixed with 30 parts by weight of starch and 1200 parts by volume of water, and the mixture boiled to form a paste. The so-obtained paste is then admixed with 100 parts by weight of millet honey (27° Bé.) and 28 parts by weight of malt powder, and the mixture maintained at a temperature of 37° C. for a period of time (1 hour), after which 0.02 part by weight of protease, obtained by culturing of *Streptomyces griseus* is added. The resultant mixture is thoroughly stirred while the temperature is slowly raised to 50° C., this temperature being maintained for a period of one hour, whereby the protein is hydrolyzed. The mixture is then stirred for 3 hours at a temperature of 55° to 85° C. to effect saccharification. Upon filtration of the resultant mass, 1000 parts by volume of a wort are obtained.

After the addition of this wort of 23 parts by weight of hops and 0.4 part by weight of amino acid, the liquor is boiled for about one and a half hours. The liquor is then cooled, whereupon 100 parts by volume of cultured bottom-fermenting beer yeast are added. Fermentation is then carried out at a temperature of 8° to 14° C. for 10 days, and further at a temperature of 3° to 5° C. for about 30 days in a closed vessel, whereby slow fermentation and maturing, as well as dissolution of ferment carbon dioxide gas, are accomplished. The thus-fermented liquor is cooled at −1° C., and filtered under pressure to yield the new beverage according to the invention.

The compositions of the saccharified liquor and the product are as follows:

|  | Wort liquor | Product |
|---|---|---|
| pH | 5.6 | 4.3 |
| Balling | 11.3 | 3.1 |
| Total sugar percent | 10.4 |  |
| Direct sugar do | 9.2 | 0.9 |
| Alcohol do |  | 4.6 |
| Protein-N mg./100 ml | 9.7 | 1.49 |
| Peptide-N do | 42.8 | 43.56 |
| Amino-N do | 52.5 | 30.9 |
| Total-N do | 105.0 | 75.9 |

The term "gluten," as used in the foregoing example, refers to the mixture of plant proteins occurring in cereal grains, especially wheat, and composed chiefly of gliadin and glutenin. (Other plant proteins may also be used.)

The malt is that obtained from selected barley.

The starch is in the form of, e.g., refined corn grits (pure starch). Other varieties of pure starch may also be used.

Proteases which may be employed than that indicated in the foregoing example are, e.g., pepsin, trypsin and the like proteases.

The amino acid may be L-tyrosin, L-phenylalanine and the like or mixtures thereof.

The yeast used for fermentation may, e.g., be *Saccharomyces cerevisiae* Hansen or *Saccharomyces carlsbergensis* Hansen, but other bottom-fermenting beer yeasts may also be used.

What is claimed is:

The method of manufacturing alcoholic malt beverage which comprises milling a member selected from the group consisting of rice and rice bran with pure protein and with a cereal selected from the group consisting of millet, Italian millet, barnyard millet, and a mixture thereof; mixing the product of such milling with starch and water and boiling to form a paste; mixing said paste with millet honey and malt in a minimum amount sufficient to cause saccharification; maintaining the mixture at a temperature of about 37° C. for about 1 hour; adding protease to the mixture; slowly raising the temperature to about 50° C. and maintaining said temperature for about 1 hour; stirring the mixture for about 3 hours at a temperature in the range of 55° to 85° C.; filtering the resultant mass to obtain a wort; adding a small quantity of hops and amino acid to the solution and boiling for about one and one-half hours; cooling the solution; inoculating with cultured yeast; and fermenting to a suitable degree.

References Cited by the Examiner

UNITED STATES PATENTS 2,790,718 4/57 Nugey _____ 99—52
3,081,172 3/63 Dennis et al. _____ 99—51

A. LOUIS MONACELL, *Primary Examiner.*

ABRAHAM H. WINKELSTEIN, *Examiner.*